(12) United States Patent
Hotait et al.

(10) Patent No.: US 10,208,848 B2
(45) Date of Patent: Feb. 19, 2019

(54) GEAR BAFFLE

(71) Applicant: GM Global Technology Operations LLC, Detroit, MI (US)

(72) Inventors: Mohammad A. Hotait, Rochester Hills, MI (US); Avinash Singh, Sterling Heights, MI (US); Ahmet Kahraman, Westerville, OH (US); David Talbot, New Albany, OH (US); Samuel Shon, Plain City, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 15/202,205

(22) Filed: Jul. 5, 2016

(65) Prior Publication Data

US 2017/0030457 A1 Feb. 2, 2017

Related U.S. Application Data

(60) Provisional application No. 62/198,396, filed on Jul. 29, 2015.

(51) Int. Cl.
*F16H 57/04* (2010.01)

(52) U.S. Cl.
CPC ..... *F16H 57/0423* (2013.01); *F16H 57/0463* (2013.01)

(58) Field of Classification Search
CPC .................. F16H 57/0423; F16H 57/0463
See application file for complete search history.

(56) References Cited

U.S. PATENT DOCUMENTS

| | | | | |
|---|---|---|---|---|
| 3,529,698 A * | 9/1970 | Nelson | ................. | B61C 17/08 184/11.2 |
| 3,625,310 A * | 12/1971 | Herrick | ............... | F16H 57/0447 184/13.1 |
| 4,270,497 A * | 6/1981 | Valerio | .............. | F01M 11/0004 123/195 C |
| 4,470,324 A * | 9/1984 | Renk | .................... | F16H 57/0423 277/409 |
| 4,519,348 A * | 5/1985 | Hamilton | ........... | F01M 11/0004 123/195 C |
| 4,630,711 A * | 12/1986 | Levrai | ................ | F16H 57/0447 184/11.1 |
| 4,721,184 A * | 1/1988 | Sowards | ............. | F16H 57/0447 184/11.1 |
| 5,038,631 A * | 8/1991 | Renk | ........................ | B61C 9/38 277/347 |
| 6,616,432 B2 * | 9/2003 | Szczepanski | ........... | F04C 2/082 184/11.1 |
| 7,421,921 B2 * | 9/2008 | Kimura | ................ | F16H 57/043 184/1.5 |
| 7,686,137 B2 * | 3/2010 | Tominaga | ........... | F16H 57/0406 184/11.3 |
| 8,899,381 B2 * | 12/2014 | Ebihara | ................ | B60K 7/0007 184/6.12 |

(Continued)

*Primary Examiner* — Michael A Riegelman

(57) ABSTRACT

A fluid containing component is provided having a structure and a sump for storing a fluid. A gear baffle is disposed between the rotatable component and the structure. The gear baffle includes a first side end and a second side defining a gear cavity therebetween. The fluid displaced by rotation of a gear positioned within the gear baffle collects on inner surfaces of the gear baffle and is directed out of the gear baffle through at least one flow port of the baffle.

14 Claims, 9 Drawing Sheets

(56) References Cited

U.S. PATENT DOCUMENTS

| | | | | |
|---|---|---|---|---|
| 9,772,027 B2* | 9/2017 | Preston | ............... | F16H 57/0423 |
| 9,810,311 B1* | 11/2017 | Zhang | ................ | F16H 57/0423 |
| 9,856,971 B2* | 1/2018 | Mikami | .............. | F16H 57/0424 |
| 2005/0103570 A1* | 5/2005 | Gibson | ............... | F16H 57/0421 |
| | | | | 184/6.12 |
| 2007/0251348 A1* | 11/2007 | Hayes | ................. | F16H 57/0421 |
| | | | | 74/606 R |
| 2009/0165587 A1* | 7/2009 | Ariga | ................. | F16H 57/0423 |
| | | | | 74/467 |
| 2009/0314580 A1* | 12/2009 | Jabs | .................... | F16H 57/0447 |
| | | | | 184/11.1 |
| 2010/0180721 A1* | 7/2010 | Quehenberger | .... | F16H 57/0419 |
| | | | | 74/606 R |
| 2012/0073403 A1* | 3/2012 | Perakes | ............... | F16H 57/0409 |
| | | | | 74/607 |
| 2017/0102064 A1* | 4/2017 | Preston | ............... | F16H 57/0423 |
| 2018/0149260 A1* | 5/2018 | Singh | ........................ | F01P 3/20 |

* cited by examiner

GEAR BAFFLE

CROSS REFERENCE TO RELATED APPLICATIONS

This application claims the benefit of U.S. Provisional Patent Application No. 62/198,396, filed on Jul. 29, 2015, the entire contents of which are incorporated herein by reference.

FIELD

The present disclosure relates to a transmission gear baffle that permits directed flow of fluid resulting from gear rotation in a fluid bath.

BACKGROUND

The statements in this section merely provide background information related to the present disclosure and may or may not constitute prior art.

Propulsion systems in motor vehicles require lubrication and cooling using a hydraulic fluid or oil to continuously operate. More specifically, the engine and especially a transmission require lubricating and cooling fluids or oils to maintain their operation and extend their useful life. The fluid is communicated throughout the transmission via hydraulic passages. Transmissions use oil pans to collect and store fluid, or oil. This fluid, or oil is for a pump, such as for automatic, CVT, or other transmissions, and/or for splash lubrication, such as for manual, DCT, or other transmissions. The pans may be wet sump or dry sump, the former storing a larger volume of fluid than the latter.

A gear rotating in a fluid or oil medium (an example is the pan) will induce a fluid flow. This flow is arbitrary in nature and can collect on other rotating or non-rotating components. The thrown hydraulic fluid, being uncontrolled, causes splash from contact with other components, steady fluid, and/or different fluid flows. The fluid splashing back onto the rotating assembly can induce drag from the fluid impact. In addition, the fluid coming in contact with a rotating component can resist its motion causing additional drag and loss of power.

The loss associated with fluid resistance to flow is known as churning loss while that of thrown fluid is referred to as fluid impact loss. The consequence of too much fluid on rotation is more than mere friction. Fluid impacting on the rotating parts has a mass which must be accelerated during engine acceleration which therefore acts as a loss on efficiency.

In addition, splashing fluid leads to aeration of the fluid. High proportions of dissolved air in oil or hydraulic fluid can in turn lead to pump cavitation and excessive softness, for example in hydraulic-actuator force-versus-displacement characteristics. Dissolved air can also reduce the effectiveness of fluid lubrication and cooling properties. Accordingly, there is a need in the art for a device which allows recovery and control of at least a portion of fluid flow caused by a gear or rotating component in a fluid bath for a later use and/or to reduce fluid splash, drag losses and aeration.

SUMMARY

A fluid containing component is provided having a structure, and a sump disposed within the structure for collecting a fluid. A gear baffle is disposed between a rotating gear and the structure. The gear baffle includes a first side and a second side defining a gear cavity therebetween which partially encloses the gear. Fluid displaced by rotation of the gear such as a helical gear positioned within the gear baffle collects on inner surfaces of the gear baffle and is directed out of the gear baffle through at least one flow port of the baffle.

In another example of the present disclosure, the at least one flow port includes three flow ports.

In yet another example of the present disclosure, a circumferential flow port defining a first one of the three flow ports is located between second and third flow ports.

In yet another example of the present disclosure, the circumferential flow port has a diameter larger than a diameter of either of the second or third flow ports.

In yet another example of the present disclosure, the second and third flow ports define side ports discharging flow collected from side directed flow from the gear rotation.

In yet another example of the present disclosure, the baffle includes one or more inlet, or outlet aperture located in a baffle body portion selectively positioned in a fluid bath.

In yet another example of the present disclosure, first and second side portions of the baffle collect side flow from the rotating gear, the first and second side portions each including an inclined surface directing flow by gravity to first or second side ports of the first and second side portions.

Further examples and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

Figure 1:
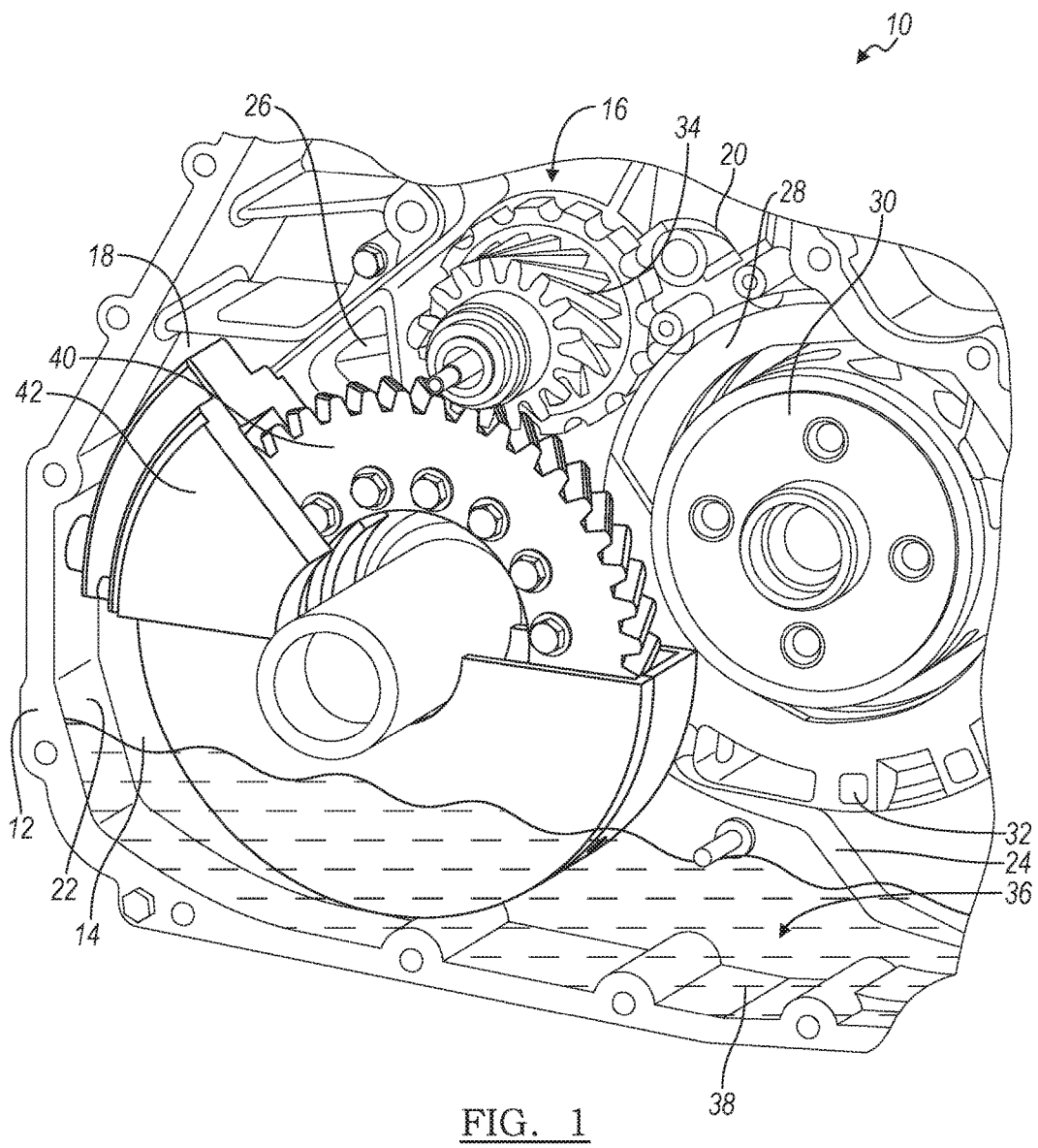
FIG. 1 is a partial, isometric cross-sectional view of an exemplary automatic transmission having a gear baffle according to the principles of the present disclosure.

With reference to FIG. 1, a portion of an exemplary automatic transmission is generally indicated by reference number 10. The transmission 10 may be a multiple speed, automatic including a continuously variable transmission (CVT), or manual shifting transmission. The transmission 10 is depicted as a front wheel drive transmission, though it should be appreciated that the transmission 10 may be a rear wheel drive transmission without departing from the scope of the present disclosure. The transmission 10 generally includes a transmission case 12 that houses a sump section 14 and a gear train section 16.

The transmission case 12 can be a cast, metal housing which encloses and protects the various components of the transmission 10. The transmission case 12 includes a variety of apertures, passageways, shoulders and flanges which position and support these components. More specifically, the transmission case 12 defines an axially extending central cavity 18 that includes a front portion 20 and a rear portion 22. The front portion 20 is preferably sized to enclose a hydrodynamic fluid drive device (not shown), such as a conventional torque converter or fluid coupling device. The rear portion 22 extends axially away from the front portion 20. The rear portion 22 is preferably sized to enclose the gear train section 16.

The transmission case 12 also includes a lower case wall 24 that separates the gear train section 16 from the sump section 14. The lower case wall 24 includes a plurality of case drain holes or windows 26 that communicate between the gear train section 16 and the sump section 14. A plurality of case drain holes allow for the communication of hydraulic fluid from the gear train section 16 to the sump section 14.

The sump section 14 is located underneath the gear train section 16 and generally includes a dry or wet sump, not specifically shown, as well as various hydraulic controls and valves (in the case of automatic/CVT transmissions). The sump section 14 is used to store the hydraulic fluid that is distributed throughout the transmission 10.

The gear train section 16, as noted above, includes rotating components operable to transmit torque from an engine of the motor vehicle to a final drive train in a plurality of forward and reverse gear ratios, as is known in the art. These components are not shown specifically in FIG. 1 in order to provide clarity to the figure. However, an exemplary rotating component, indicated by reference number 30, is shown. The rotating component 30 is, in the example provided, an input shell 28 that encircles other rotating components, such as planetary gears, rotating clutches or brakes, and/or rotating shafts or other members. The rotating component 30 includes a plurality of slots 32 that allow hydraulic fluid to communicate through the rotating component 30. In the example provided, the rotating component 30 is coupled to a rotating member 34 such as a helical gear (shown). The rotating member 34 may be in turn coupled to a gear 40 such as for example a final drive helical gear shown. The gear 40 may be at least partially immersed in a volume or bath 36 of a fluid 38 such as hydraulic fluid present in the sump section 14. According to several aspects of the present disclosure, a baffle 42 is installed to at least partially enclose the gear 40 as will be described in greater detail below.

Referring now to FIGS. 2-12 and again to FIG. 1, the baffle 42 according to the principles of the present disclosure may be used to partially enclose the gear 40, leaving clearance for engagement by a coupled member such as the rotating member 34. The baffle 42 may be positioned at least partially in a bath of fluid such as oil or transmission fluid in the sump section 14, used to collect a portion of the hydraulic fluid outwardly displaced by axial rotation of the gear 40, and further used to provide positively directed flow of the transmission fluid or oil generated by rotation of helical gear 40 within the transmission 10. The baffle 42 is preferably made from a polymer. The baffle 42 is preferably made using an injection molding process to accommodate the complex inner geometry of the flow passages described in detail below. Other materials and manufacturing methods can also be used within the scope of the present disclosure.

The baffle 42 will now be described in greater detail. With specific reference to FIG. 2 and again to FIG. 1, the baffle 42 is generally semi-circular in shape and includes a semi-circular baffle body 44 having a longitudinal axis "A" through a center of the semi-circular baffle body 44 corresponding to an axis of rotation of the gear 40. The semi-circular baffle body 44 includes a body first side 46, and a body second side 48 oriented substantially parallel to and opposed with respect to body first side 46. The body first side 46 and the body second side 48 together define a gear cavity 50 therebetween. The body first side 46 includes a first shaft opening 52 and the body second side 48 includes a second shaft opening 54, the first and second shaft openings 52, 54 are co-axially aligned on the longitudinal axis "A" to support receipt of a shaft supporting the gear 40.

The baffle 42 further includes baffle collector end 56 connected to the baffle body 44. A collector end cavity 58 of the baffle collector end 56 opens into and therefore is in fluid communication with the gear cavity 50. At least one and according to several aspects, a plurality of apertures 60 are provided in each of the body first side 46 and the body second side 48 which permit positioning of fasteners (not shown) used to releasably mount the baffle 42 to structure of the transmission 10. When the baffle 42 is mounted to the transmission 10, a portion of the baffle body 44 is immersed in a fluid bath 62 such as oil or hydraulic fluid permitting entrance of the fluid into the baffle body 44.

Figure 2:
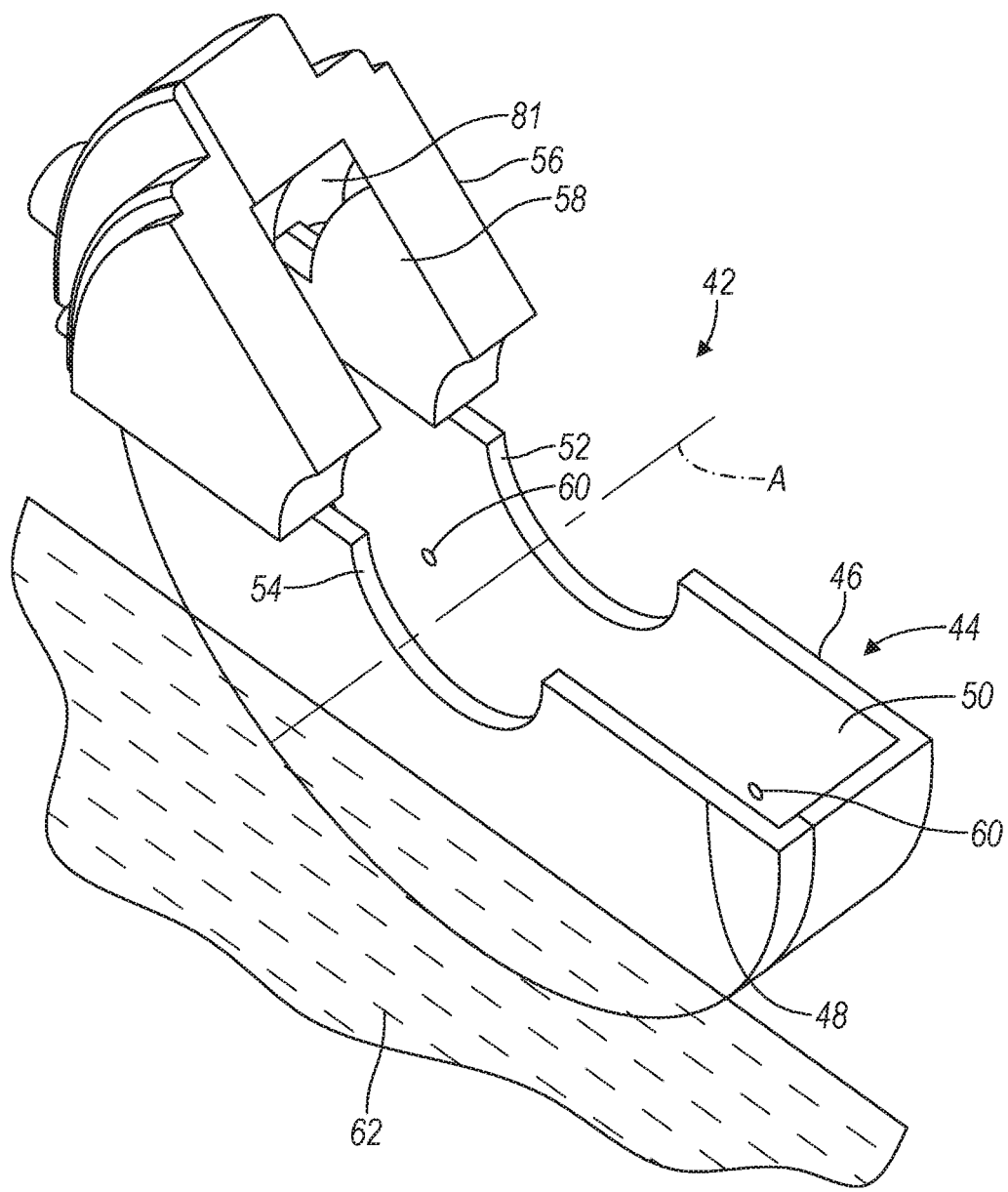
FIG. 2 is a front left perspective view of an embodiment of a gear baffle according to the present disclosure.

Referring to FIG. 3 and again to FIG. 2, the baffle body 44 can be provided as a unitary one-piece unit, or can be provided in two or more pieces. For example, the body first side 46 can be joined to the body second side 48 at a joining line "JL" which can be created during an injection molding process as a fixed molding line, a sealed joint created such as by using an adhesive, or having the body first side 46 joined to the body second side 48 using one or more fasteners such as a clip, rivets or screws. If present, the position of the joining line "JL" can vary at the discretion of the manufacturer. The baffle body 44 also includes an impingement wall 64, an interior facing side of which is adapted to collect fluid impinging against the impingement wall 64. A semi-circular opening defining an angle alpha (α) is provided between an edge of the impingement wall 64 and a baffle end face 106. The opening defined by the angle alpha can range between approximately 90 degrees to approximately 180 degrees, and provides clearance for engagement of the gear teeth of the gears such as the rotating member 34 and the gear 40 both shown and described in reference to FIG. 1.

A circumferential flow port 66 for discharge of fluid collected within the baffle 42 is created in a collector end wall 68. The baffle body 44 has further components extending from the baffle collector end 56. These include a first side portion 70 extending outwardly with respect to body first side 46, having a first side port 72 created therein, and a second side portion 74 extending outwardly with respect to body second side 48, having a second side port 76 created therein. According to several aspects, the circumferential flow port 66 is anticipated to discharge the largest flow volume of fluid collected by baffle 42, and is therefore larger in diameter than each of the first side port 72 and the second side port 76. First side port 72 and second side port 76 can have same or different diameters.

It should be appreciated that other quantities and/or configurations of apertures or openings may be employed with the present disclosure, for example, the plurality of circumferential flow ports 66, or flow ports 66 oriented at different angular orientations without departing from the scope of the present disclosure.

Figure 3:
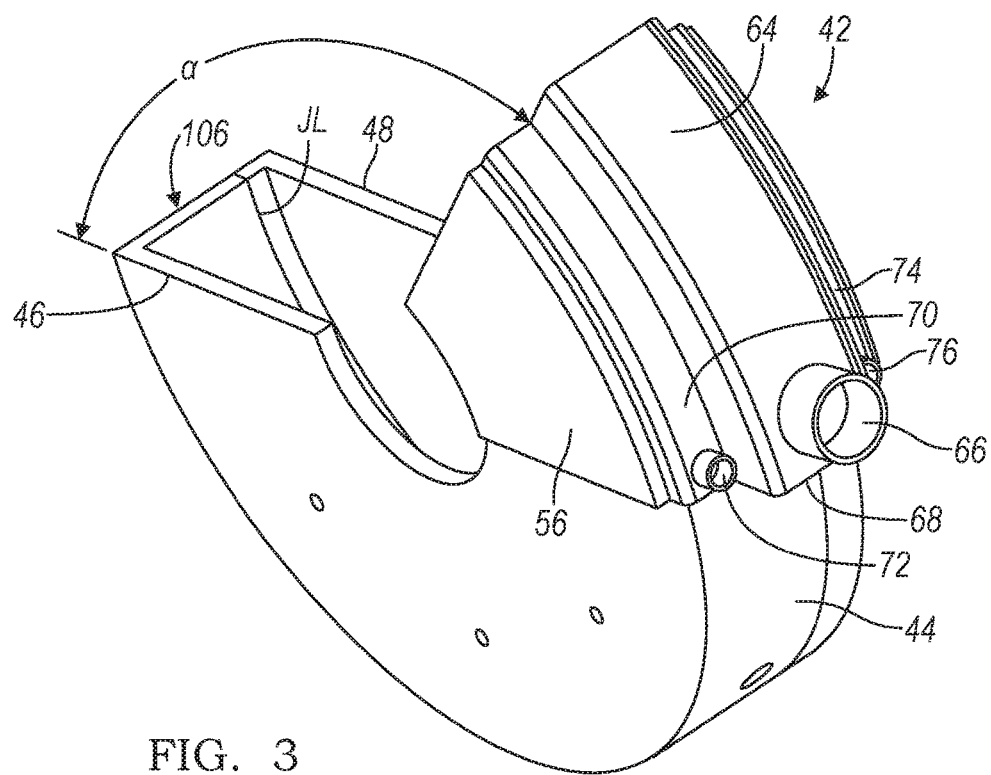
FIG. 3 is a rear left perspective view of an embodiment of the gear baffle of FIG. 2.

Referring to FIG. 4 and again to FIG. 3, the baffle collector end 56 of the baffle 42 further includes a collector end face 78 having the first side portion 70 extending outwardly with respect to the first body first side 46, and the second side portion 74 extending outwardly with respect to the second body side 48. The collector end face 78 is substantially parallel to the collector end wall 68, and is partially removed to thereby open into the collector end cavity 58. A first side channel 80 is partially visible in FIG. 4, which will be described in greater detail in reference to FIGS. 6 and 9-10.

Figure 4:
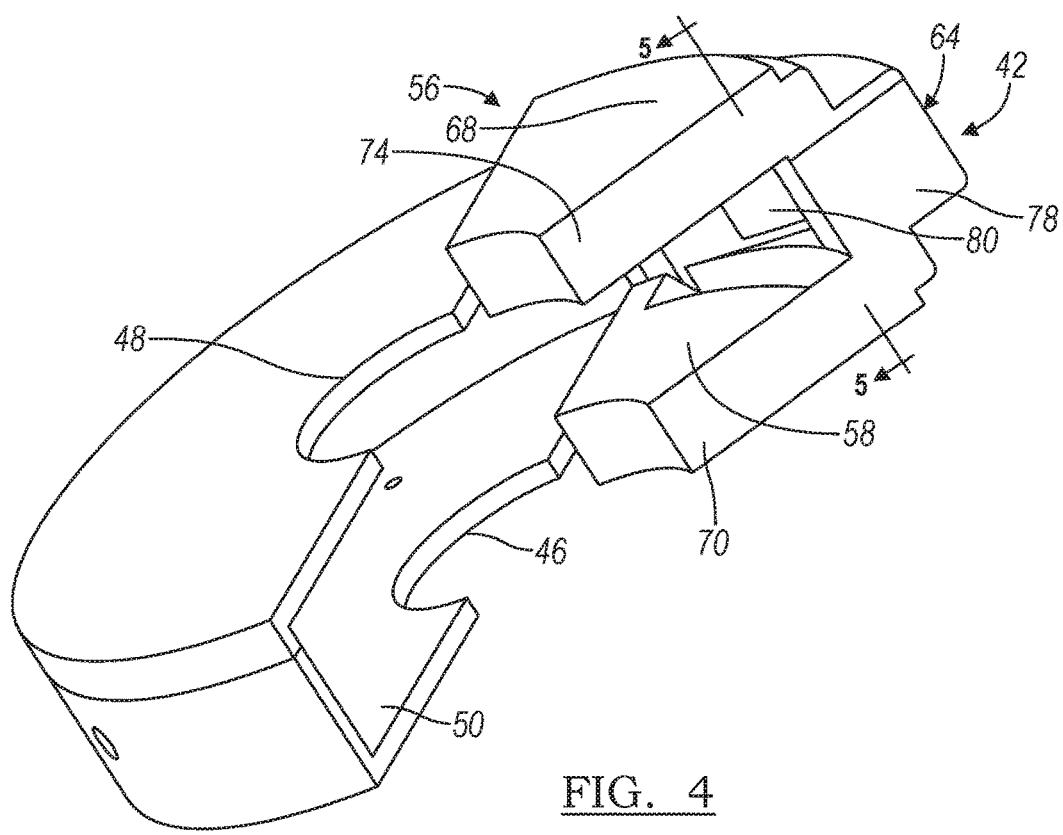
FIG. 4 is a front right perspective view of an embodiment of the gear baffle of FIG. 2.

Referring to FIG. 5 and again to FIGS. 3-4, a portion of the baffle collector end 56 is shown removed for clarity to show internal flow passages created in the baffle collector end 56. A first channel passage 82 is created in the first side portion 70. A first channel flow diverter 84 directs a portion of the fluid from first side channel 80 into the first channel passage 82. The first channel passage 82 communicates with the first side channel 80 via a first channel entrance 86. Similarly, a second channel passage 88 is created in the second side portion 74. A second channel flow diverter 90 directs a portion of the fluid from a second side channel 81 (shown in reference to FIG. 2) into the second channel passage 88. The second channel passage 88 communicates with the second side channel 81 via a second channel entrance 92. Fluid at the first side channel 80 is thereby directed to the first side port 72 (shown in FIG. 3), and fluid at the second side channel 81 is thereby directed to the second side port 76 (shown in FIG. 3). The size and features of the first and second side portions 70 and 74 can be different.

Referring to FIG. 6 and again to FIGS. 3-4, fluid to be discharged via the circumferential flow port 66 is collected directly from the collector end cavity 58 via a circumferential flow channel 94. According to several aspects, the first side channel 80 can also open into the circumferential flow channel 94. The geometry of circumferential flow channel 94 including the inlet and outlet angles can vary from that shown, therefore a radius of a flow change can also vary within the scope of the present disclosure. Because the predominant flow of fluid away from the gear 40 is directed circumferentially or radially outwardly away from the outward faces of the gear teeth, the circumferential flow channel 94 is anticipated to discharge the greatest fluid flow collected by the baffle 42.

Figure 7:
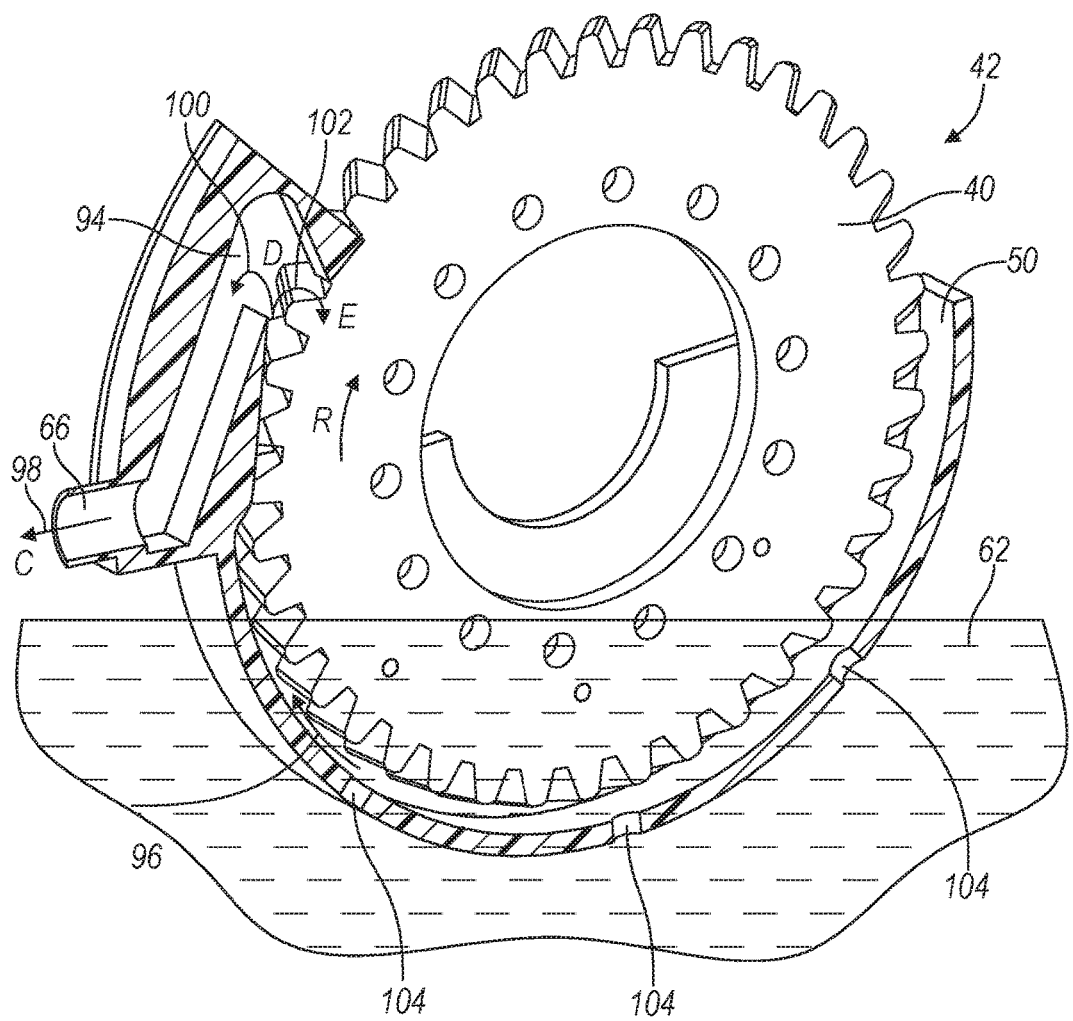
FIG. 7 is a cross-sectional left rear perspective view of the embodiment of the gear baffle of FIG. 6, further adding a helical gear.
Figure 8:
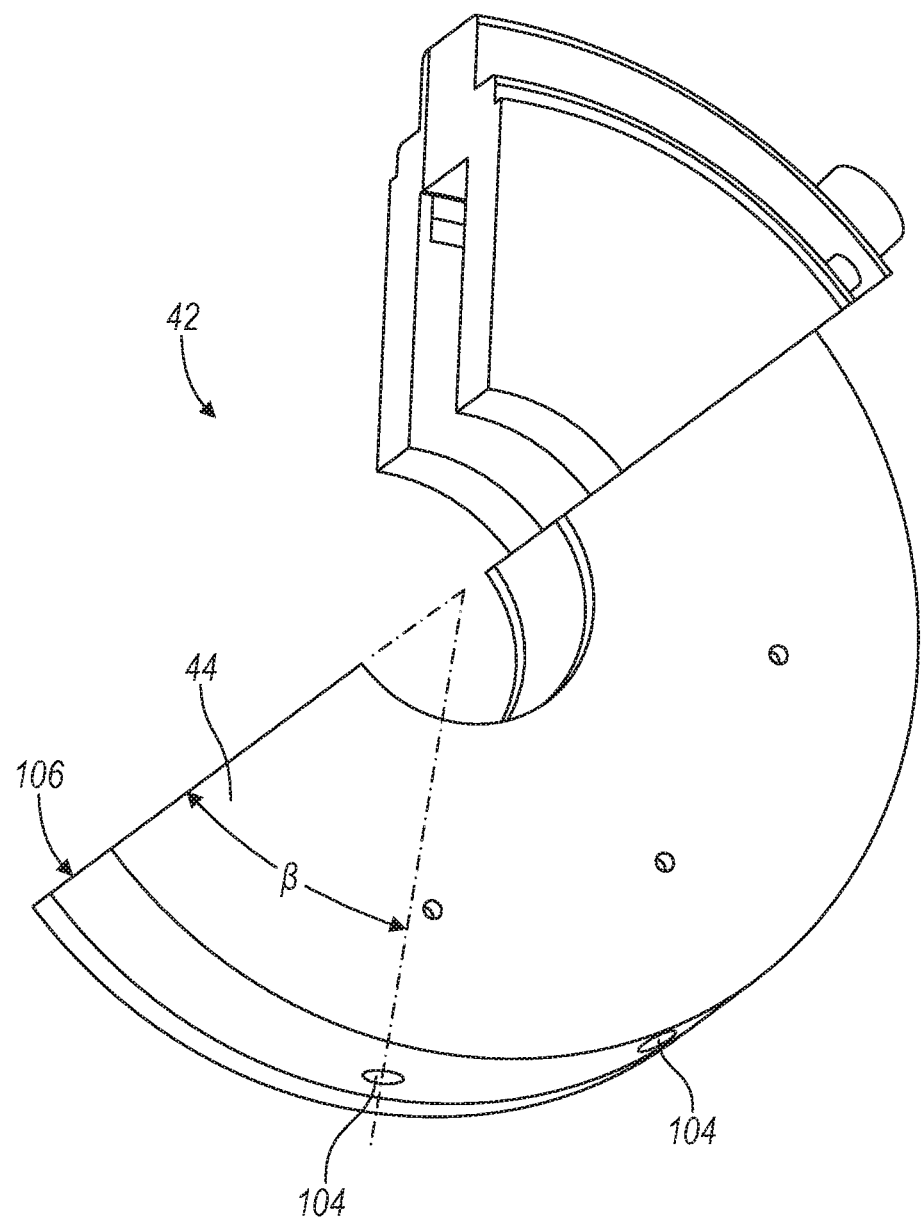
FIG. 8 is a bottom left perspective view of the embodiment of the gear baffle of FIG. 2.
Figure 9:
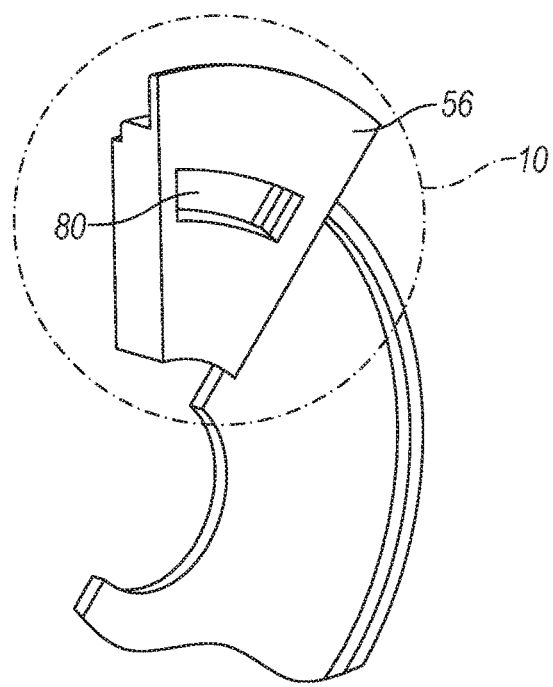
FIG. 9 is a cross-sectional left rear perspective view of area 9 of FIG. 6.
Figure 10:
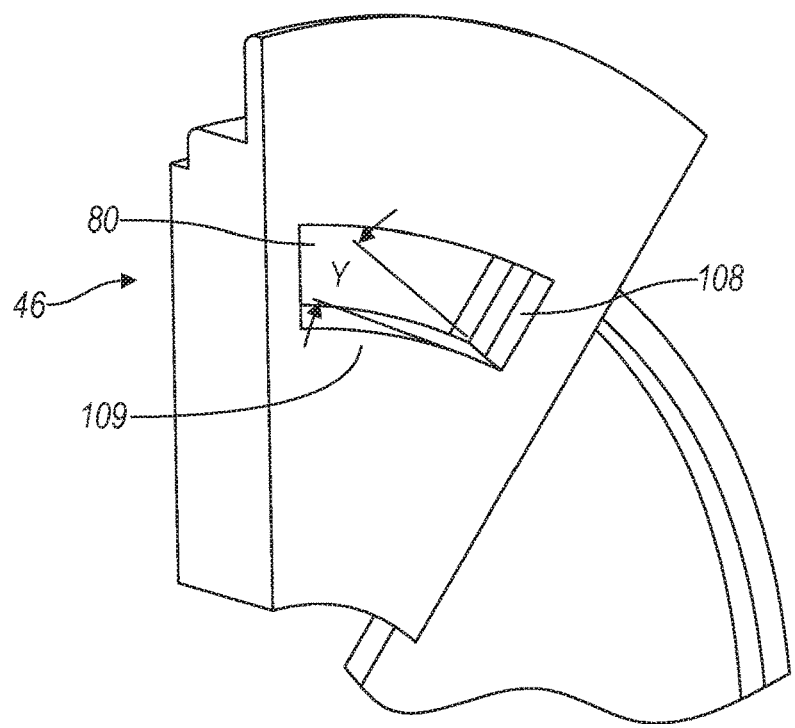
FIG. 10 is a cross-sectional left rear perspective view of area 10 of FIG. 9.
Figure 11:
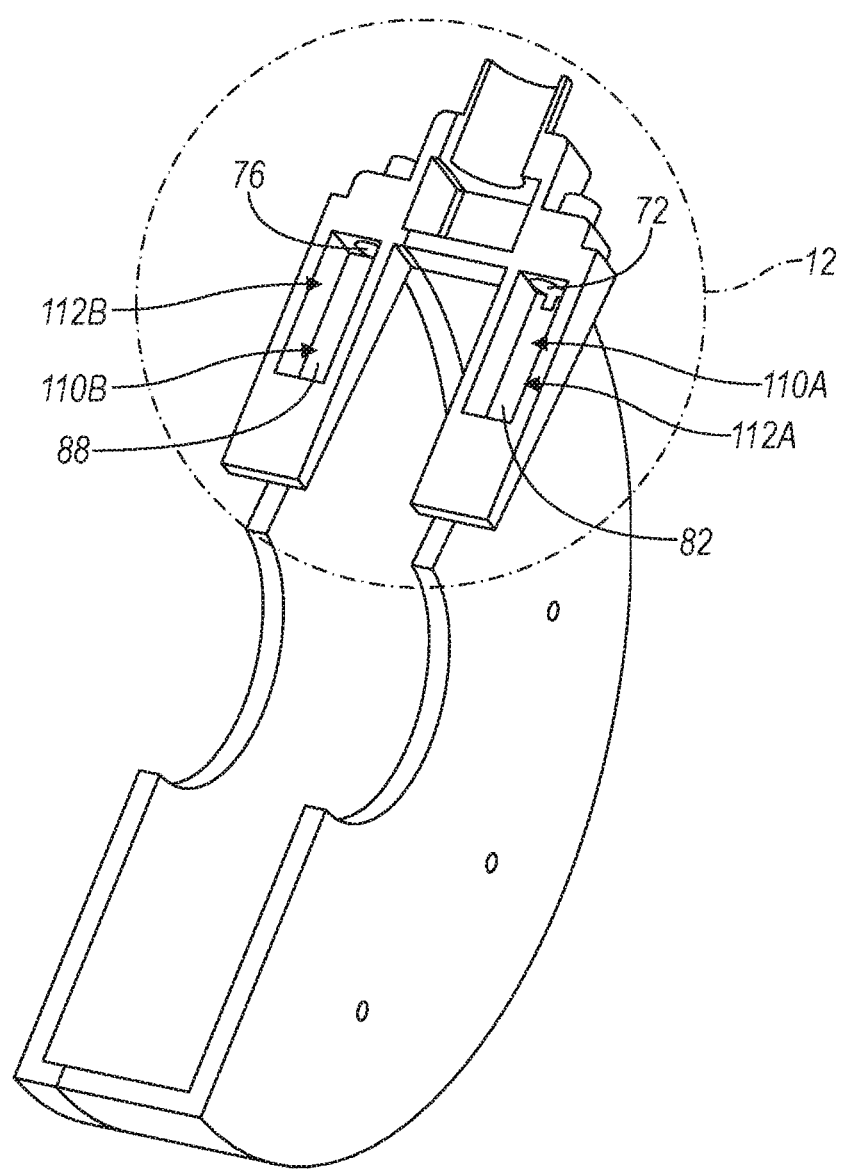
FIG. 11 is a rear right partial cross-sectional perspective view of an embodiment of the gear baffle of FIG. 2.
Figure 12:
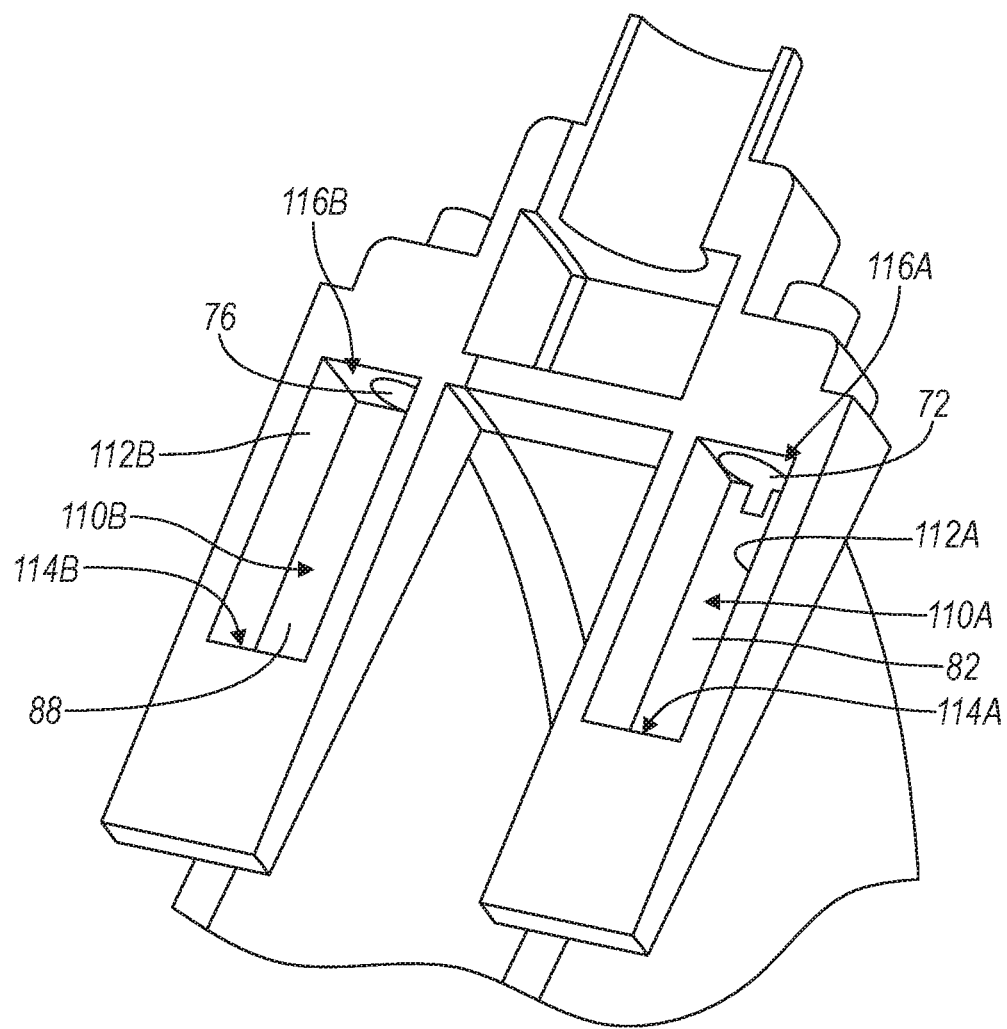
FIG. 12 is a rear right partial cross-sectional perspective view of area 12 of FIG. 11.

Referring to FIG. 7, baffle 42 can be used to collect circumferentially and side discharged fluid from any rotating gear, and the gear 40 shown as a helical gear is therefore only an exemplary aspect of a gear arrangement. Different sized gears and different types of gears can also be accommodated by changing the size and/or geometry of baffle 42, without departing from the scope of the present disclosure. A geometry of the gear cavity 50 and the collector end cavity 58 are selected to minimize churning of the fluid during gear rotation by using the baffle 42 to limit the amount of oil the gear (i.e., gear 40) will directly contact and thereby to reduce churning. This is a function of clearances, both radially and axially between the gear 40 and the baffle 42.

With a portion of gear 40 positioned within both the gear cavity 50 and the collector end cavity 58, rotation of gear 40 in a gear rotation "R" causes flow of fluid in a main flow path 96, shown in the gear area as a flow before separation "B". The baffle 42 is designed to advantageously redirect portions of the fluid from main flow path 96 as the flow reaches the collector end cavity 58. Normally, rotation of the gear 40 will produce a circumferential flow "C" depicted as a circumferential flow path 98, which is collected and discharged via the circumferential flow port 66. Rotation of the gear 40 will also produce side flows "D", "E", to either side of the gear 40, depicted as a first side flow path 100 and a second side flow path 102. These flows are advantageously collected for discharge from the baffle 42 via the first and second side ports 72, 76. When positioned and partially submerged in the fluid bath 62, fluid enters the baffle body 44 via one or more baffle inlet apertures 104. In a different aspect, there can be one or more baffle inlet apertures 104 with the same or different sizes that that can serve as the baffle 42 inlet or outlet.

Referring to FIG. 8 and again to FIG. 7, an orientation or central axis of the baffle inlet apertures 104 can vary over a range of angles, with a first one of the baffle inlet apertures 104 oriented at an angle beta ($\beta$), determined with respect to the baffle end face 106. According to several aspects, angle $\beta$ can range between approximately 0 to 180 degrees, and can be provided as a common spacing angle $\beta$ of approximately 45 degrees between successive ones of the baffle inlet apertures 104.

Referring to FIGS. 9 and 10, and again to FIG. 3, features of the first side channel 80 include a side channel inlet wall 108 which is oriented at an angle gamma ($\gamma$) with respect to an inner wall 109 of body first side 46. According to several aspects, angle $\gamma$ can range between approximately 0 to 45 degrees. The angular entrance of first side channel 80 (as well as the corresponding second side channel 81 not shown in this view for body second side 48), promotes transitioning of fluid flow into the first and second side ports 72, 76.

Figure 5:
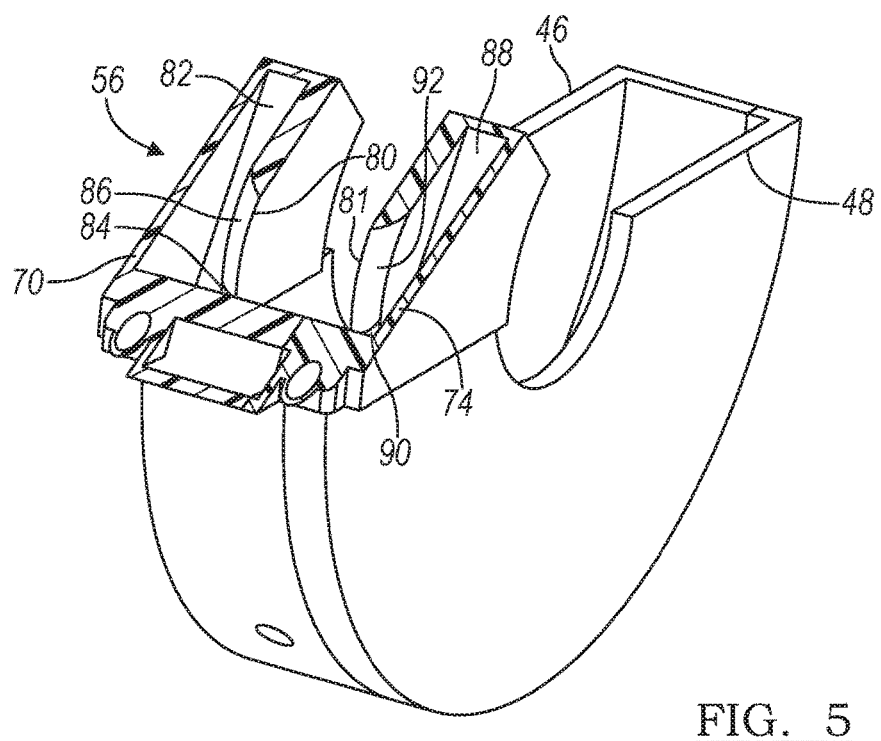
FIG. 5 is a cross-sectional top right perspective view of an embodiment of the gear baffle of FIG. 2.
Figure 6:
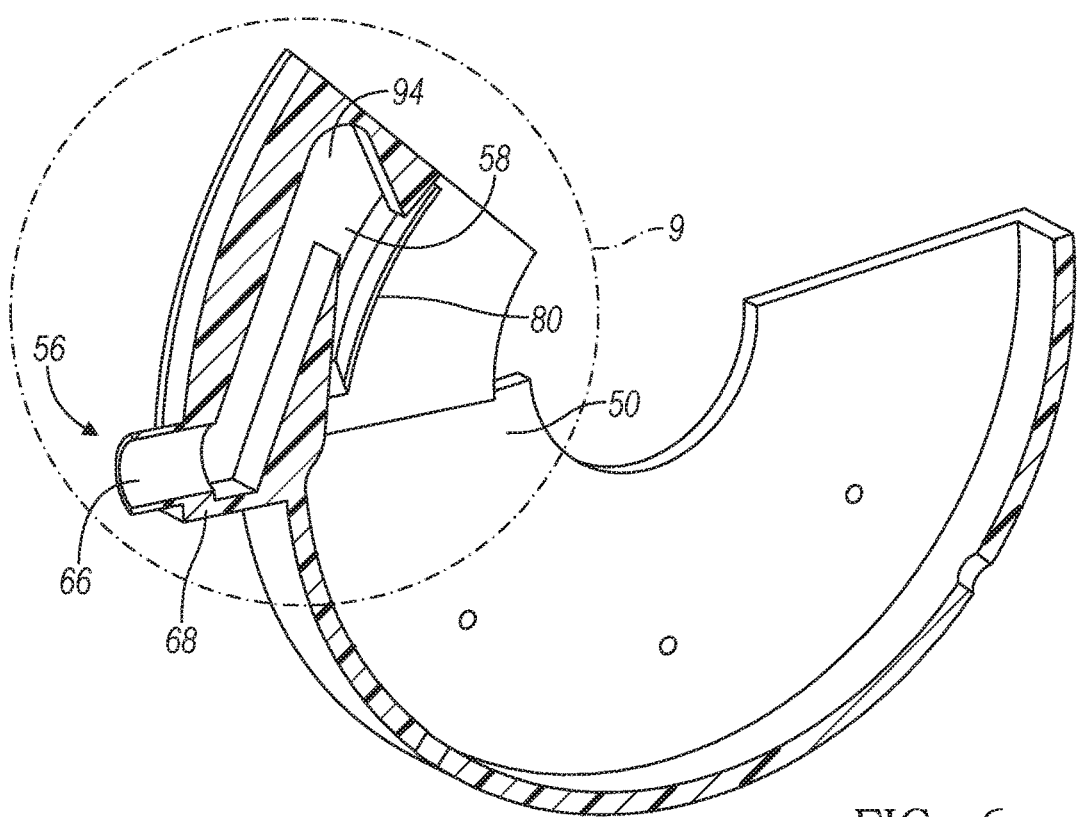
FIG. 6 is a cross-sectional left rear perspective view of the embodiment of the gear baffle of FIG. 2.

Referring to FIGS. 11 and 12, and again to FIG. 5, according to a further aspect, an inclined surface 110A, 110B is provided for each of the first channel passage 82 and the second channel passage 88. The inclined surfaces 110A, 110B allow for gravity flow of fluid present on either of the inclined surfaces to reach the first or second side ports 72, 76. An inclined perimeter wall 112A, 112B is therefore provided between first height ends 114A, 114B of the inclined perimeter walls 112A, 112B and second height ends 116A, 116B, with the second height ends being greater in height than the first height ends.

Returning to FIGS. 1 and 2, the baffle 42 can be disposed between the transmission case 12 and the gear 40 within the gear train section 16. More specifically, the baffle 42 partially encircles the gear 40 such that the gear 40 is disposed within both the gear cavity 50 and the collector end cavity 58 of the baffle 42. Moreover, as shown in reference to FIG. 2, a bottom portion of the baffle 42 is oriented such that the bottom portion is adjacent the sump section 14 of the transmission 10 and therefore is partially submerged in the fluid bath 62.

As the gear 40 rotates, fluid in contact with the gear teeth is propelled centrifugally outward due to centrifugal force. The fluid is collected after contacting the inner walls of the baffle collector end 56. A fluid flow force generated by rotation of the gear 40 forces the fluid to move upward into the side channels of the baffle 42 and out through the circumferential flow port 66 and the first and second side ports 72, 76. The fluid therefore exits the baffle 42 in one of three (3) different directions through individual ones of the circumferential flow port 66, the first side port 72, and the second side port 76. Fluid collected by the baffle 42 can be used by fluid sampling equipment to determine a flow rate of fluid generated by the gear 40 for example at different gear rotational speeds, and can be transferred to other areas of the transmission 10 or other component where desired. By collecting the fluid from rotation of the baffle 42, fluid uncontrollably splashing onto rotating components and the sump section 14 is minimized. In addition, this fluid can be directed to other components for lubrication, cooling, and/or other purposes.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A gear baffle disposed proximate to a gear, the gear at least partially submerged in a fluid, the gear baffle comprising:
    a body having a first side and a second side;
    a gear cavity between the first side and the second side which partially encloses the gear;
    at least one flow port; and
    a collector end face having a first side portion extending outwardly with respect to the first side of the body, and a second side portion extending outwardly with respect to the second side of the body, a first channel passage created in the first side portion, and a first channel flow diverter directing a portion of the fluid from a first side channel into the first channel passage, the first channel passage in communication with the first side channel via a first channel entrance;
    wherein a fluid displaced by rotation of the gear positioned within the gear baffle collects on the first side and the second side of the gear baffle and is directed out of the gear baffle through the at least one flow port of the gear baffle.

2. The gear baffle of claim 1, wherein the at least one flow port includes three flow ports.

3. The gear baffle of claim 2, wherein a circumferential flow port defining a first flow port of the three flow ports is located between a second flow port a third flow port of the three flow ports.

4. The gear baffle of claim 3, wherein the circumferential flow port has a diameter larger than a diameter of either of the second flow port or the third flow port.

5. The gear baffle of claim 3, wherein rotation of the gear generates side flow and the second flow port and the third flow port each include a side port discharging flow collected from the side flow.

6. The gear baffle of claim 1, further comprising one or more inlet or outlet apertures located in a baffle body portion selectively positioned in a bath of the fluid.

7. The gear baffle of claim 1, wherein the first and the second side portions collect side flow from the gear during gear rotation, the first and second side portions each including an inclined surface directing flow by gravity of the fluid to first or second side ports of the first and second side portions.

8. The gear baffle of claim 1, wherein the body is made from a polymeric material.

9. The gear baffle of claim 1, wherein the body is semi-circular in shape and includes a longitudinal axis "A" through a center of the body corresponding to an axis of rotation of the gear.

10. The gear baffle of claim 1, further comprising at least one aperture provided in each of the first side and the second side which permit positioning of fasteners used to releasably mount the pear baffle to a structure of a transmission.

11. An assembly comprising:
    a gear baffle disposed between a gear and a structure, the gear baffle including:
        a body having a first side and a second side and a gear cavity between the first side and the second side which partially encloses the gear with the gear at least partially submerged in a fluid;
        multiple flow ports; and
        a baffle collector end having a collector end face wherein the collector end face includes a first side portion extending outwardly with respect to the first side of the body, and a second side portion extending outwardly with respect to the second side of the body, a first channel passage created in the first side portion, and a first channel flow diverter directing a portion of the fluid from a first side channel into the first channel passage, the first channel passage in communication with the first side channel via a first channel entrance;
    wherein as the gear rotates, the fluid contacts gear teeth of the gear and is propelled centrifugally outward due to centrifugal force for collection after contacting the inner walls of the baffle collector end; and
    wherein the fluid displaced by rotation of the gear positioned within the gear baffle collects on the first side and the second side of the gear baffle and is directed out of the gear baffle end face and through the multiple flow ports of the gear baffle.

12. The gear baffle of claim 11, wherein the baffle includes:
    a second channel passage created in the second side portion; and
    a second channel flow diverter directing a portion of the fluid from a second side channel into the second channel passage, the second channel passage in communication with the second side channel via a second channel entrance.

13. The gear baffle of claim 11:
    wherein the multiple flow ports include a circumferential flow port a first side port and a second side port; and
    wherein the fluid exits the baffle in three different directions through individual ones of the circumferential flow port, the first side port, and the second side port.

14. A gear baffle system, comprising:
    a structure;
    a sump disposed within the structure for collecting a fluid;
    a gear baffle disposed between a gear and the structure, the gear baffle including:
        a body having a first side and a second side and a gear cavity between the first side and the second side which partially encloses the gear with the gear at least partially submerged in the fluid;
        multiple flow ports including a circumferential flow port,
        a first side port and a second side port;
        a baffle collector end having a collector end face wherein the collector end face includes a first side portion extending outwardly with respect to the first side of the body, and a second side portion extending outwardly with respect to the second side of the body, a first channel passage created in the first side portion, and a first channel flow diverter directing a portion of the fluid from a first side channel into the first channel passage, the first channel passage in communication with the first side channel via a first channel entrance; and wherein the first side channel includes a side channel inlet wall oriented at an angle with respect to an inner wall of the first side of the body, the angle ranging between approximately 0 to 45 degrees to promote transitioning of fluid flow into the first and second side ports;

wherein the fluid displaced by rotation of the gear positioned within the gear baffle collects on the first side and the second side of the gear baffle and is directed out of the gear baffle end face and through the multiple flow ports of the gear baffle.

\* \* \* \* \*